United States Patent
Maness et al.

(10) Patent No.: US 10,161,537 B2
(45) Date of Patent: Dec. 25, 2018

(54) VALVE

(71) Applicant: Signode Industrial Group LLC, Glenview, IL (US)

(72) Inventors: Jeffrey A. Maness, Hot Springs National Park, AR (US); Thomas A. Ketzer, Wauconda, IL (US); Anthony K. Beard, Poyen, AR (US); James S. Zielinski, Wonder Lake, IL (US); Mark Breining, McHenry, IL (US)

(73) Assignee: Signode Industrial Group LLC, Glenview, IL (US)

( * ) Notice: Subject to any disclaimer, the term of this patent is extended or adjusted under 35 U.S.C. 154(b) by 0 days.

(21) Appl. No.: 15/360,390

(22) Filed: Nov. 23, 2016

(65) Prior Publication Data

US 2017/0074411 A1     Mar. 16, 2017

Related U.S. Application Data

(63) Continuation of application No. 14/445,903, filed on Jul. 29, 2014, now Pat. No. 9,505,334.
(Continued)

(51) Int. Cl.
*B60P 7/06* (2006.01)
*F16K 15/20* (2006.01)
(Continued)

(52) U.S. Cl.
CPC .............. *F16K 15/20* (2013.01); *B60P 7/065* (2013.01); *B65D 81/052* (2013.01);
(Continued)

(58) Field of Classification Search
CPC .. B60P 7/065; B60P 7/16; B60P 7/135; B60P 3/073; B60P 7/0876; B60P 3/075;
(Continued)

(56) References Cited

U.S. PATENT DOCUMENTS 2,390,199 A   12/1945 Walsh
2,764,428 A    9/1956 Murphy
(Continued)

FOREIGN PATENT DOCUMENTS

CA   2390968   12/2003
CN   2072178    2/1991
(Continued)

OTHER PUBLICATIONS

International Search Report and Written Opinion for International Application No. PCT/US2014/049112 dated Jan. 28, 2015 (11 pages).

*Primary Examiner* — D Glenn Dayoan
*Assistant Examiner* — Sunsurraye Westbrook
(74) *Attorney, Agent, or Firm* — Neal, Gerber & Eisenberg LLP

(57) ABSTRACT

Various embodiments of the present disclosure provide a reusable valve in which a seal portion is co-molded with and overmolded to the valve stem to provide a secure mechanical bond therebetween. In one embodiment, the valve includes a snap fit between the valve stem and a retaining cap to provide easy assembly of the valve as well as an efficient and compact retention mechanism for a biasing spring and the valve stem in relation to the valve housing. In one embodiment, the valve includes an easy-to-use opening and closing mechanism that provides tactile feedback to the user when moving the valve stem to an open position and to a closed position to inflate, deflate, or maintain air or gas pressure in the inflatable article. The present disclosure also provides a dunnage bag with such valve.

20 Claims, 13 Drawing Sheets

Related U.S. Application Data

(60) Provisional application No. 61/862,216, filed on Aug. 5, 2013.

(51) Int. Cl.
*B65D 81/05* (2006.01)
*F16K 15/06* (2006.01)
*F16K 15/18* (2006.01)
*F16K 31/528* (2006.01)

(52) U.S. Cl.
CPC ............ *F16K 15/063* (2013.01); *F16K 15/18* (2013.01); *F16K 31/528* (2013.01); *B65H 2801/63* (2013.01); *Y02W 30/807* (2015.05); *Y10T 137/3584* (2015.04); *Y10T 137/374* (2015.04)

(58) Field of Classification Search
CPC ........ B60P 3/20; B60P 3/2235; B65D 81/052; B65D 90/0073; B65D 90/004; B65D 2590/005; B65D 33/14; B65D 77/06; B65D 81/058; F16K 15/147; F16K 15/20; F16K 15/202; F16K 1/20; F16K 1/222; F16K 15/026; F16K 15/063; F16K 15/18
USPC .......... 410/119, 125, 87, 118, 129, 155, 117, 410/140, 47, 10; 137/223, 232, 224, 231, 137/523, 225, 228, 233, 522, 541; 141/10, 114, 313, 317, 347, 382, 312, 141/314, 346, 348
See application file for complete search history.

(56) References Cited

U.S. PATENT DOCUMENTS

| | | | |
|---|---|---|---|
| 3,420,493 A | 1/1969 | Kraft | |
| 3,445,089 A | 5/1969 | Murray | |
| 3,808,981 A | 5/1974 | Shaw | |
| 3,960,281 A | 6/1976 | Reeves | |
| 3,995,653 A | 12/1976 | Mackal et al. | |
| 4,073,389 A | 2/1978 | Angarola et al. | |
| 4,102,364 A | 7/1978 | Leslie et al. | |
| 4,146,069 A | 3/1979 | Angarola et al. | |
| 4,146,070 A | 3/1979 | Angarola et al. | |
| 4,478,587 A | 10/1984 | Mackal | |
| 4,579,141 A | 4/1986 | Arff | |
| 4,633,910 A | 1/1987 | Sugimura | |
| 4,766,628 A | 8/1988 | Walker et al. | |
| 4,927,397 A | 5/1990 | Yeager | |
| 5,042,541 A | 8/1991 | Krier et al. | |
| 5,082,244 A * | 1/1992 | Krier | F16L 37/40 251/149.6 |
| 5,111,838 A | 5/1992 | Langston | |
| 5,651,403 A | 7/1997 | Andersen | |
| 5,678,969 A | 10/1997 | Farrell et al. | |
| 5,730,564 A | 3/1998 | Howlett | |
| 5,806,572 A | 9/1998 | Voller | |
| 5,839,488 A | 11/1998 | Peters | |
| 5,871,031 A | 2/1999 | Greinacher | |
| D406,238 S | 3/1999 | Voller | |
| 5,941,272 A | 8/1999 | Feldman | |
| 6,053,222 A | 4/2000 | Peters et al. | |
| 6,085,744 A | 7/2000 | Andersen | |
| 6,098,251 A | 8/2000 | Zielinski | |
| 6,129,491 A | 10/2000 | Duursma | |
| 6,138,711 A | 10/2000 | Lung-Po | |
| 6,220,800 B1 | 4/2001 | Elze et al. | |
| 6,386,247 B1 | 5/2002 | Elze et al. | |
| D458,135 S | 6/2002 | Hierzer | |
| D459,228 S | 6/2002 | Hierzer | |
| 6,823,905 B1 | 11/2004 | Smith et al. | |
| D499,637 S | 12/2004 | Elze et al. | |
| 6,929,021 B2 | 8/2005 | Cavenagh | |
| 6,990,994 B2 | 1/2006 | Reeb | |
| 7,008,155 B2 | 3/2006 | Smith et al. | |
| 7,051,753 B1 | 5/2006 | Caires et al. | |
| 7,137,765 B1 | 11/2006 | Elze et al. | |
| 7,195,029 B2 * | 3/2007 | Wass | F16K 15/026 137/223 |
| 7,320,347 B2 | 1/2008 | Ramsey et al. | |
| 7,410,145 B1 | 8/2008 | Elze et al. | |
| 7,434,594 B1 | 10/2008 | Robbins et al. | |
| 7,455,086 B1 | 11/2008 | Elze et al. | |
| 7,610,929 B2 | 11/2009 | Zielinski et al. | |
| 7,793,687 B2 | 9/2010 | Smith et al. | |
| 7,909,554 B2 | 3/2011 | Keenan et al. | |
| 7,980,799 B1 | 7/2011 | Rioux | |
| 8,235,632 B2 | 8/2012 | Keenan | |
| 8,347,919 B2 * | 1/2013 | Tsai | F16K 15/202 137/223 |
| D679,589 S | 4/2013 | Hauth | |
| 8,627,852 B2 * | 1/2014 | Hatton | B60P 7/065 137/224 |
| 8,753,051 B2 | 6/2014 | Qiang | |
| 8,919,731 B2 * | 12/2014 | Langston | F16K 15/20 141/10 |
| 2009/0139582 A1 | 6/2009 | Franta et al. | |
| 2014/0202556 A1 * | 7/2014 | Do Van | B60P 7/065 137/223 |

FOREIGN PATENT DOCUMENTS

FR 2627839 9/1989
JP S6490009 A 4/1989

* cited by examiner

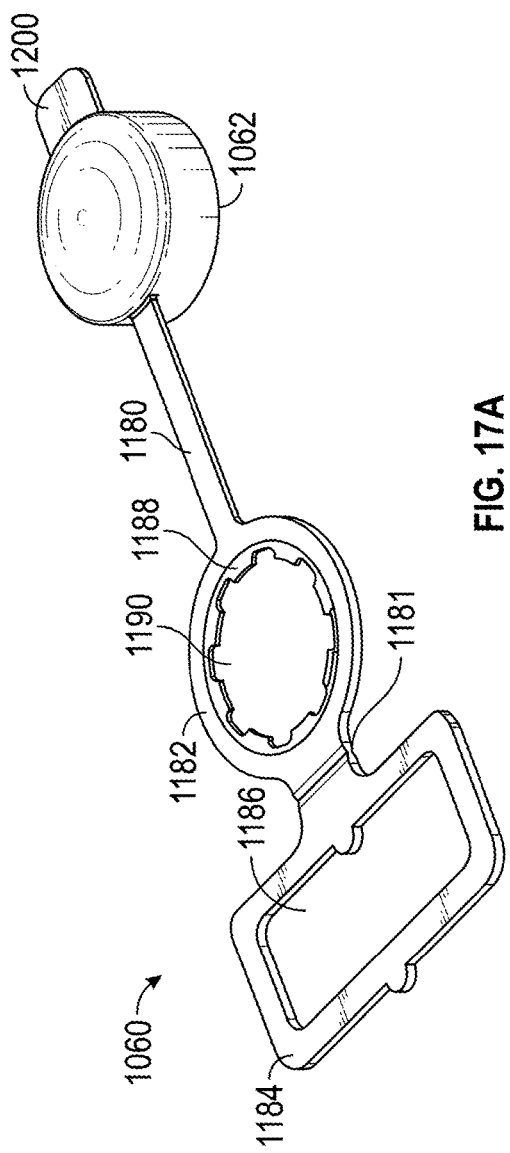
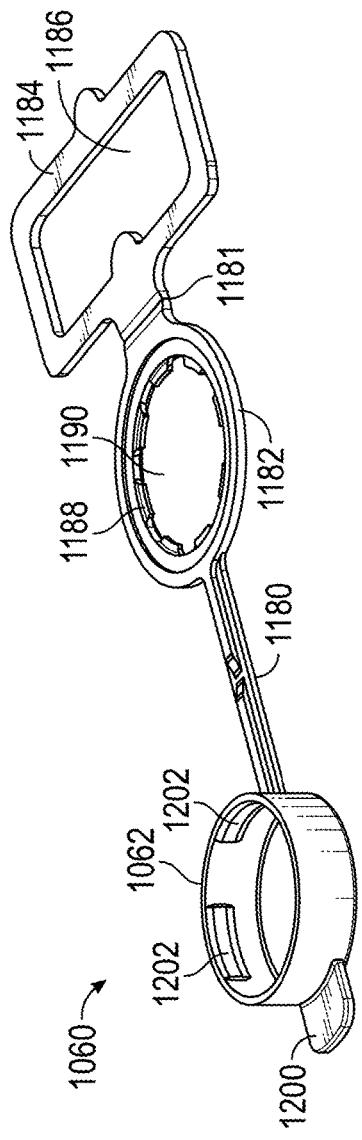
FIG. 17A
FIG. 17B

VALVE

PRIORITY CLAIM

This application is a continuation of, and claims priority to and the benefit of, U.S. patent application Ser. No. 14/445,903, which was filed on Jul. 29, 2014, which claims priority to and the benefit of U.S. Provisional Patent Application No. 61/862,216, which was filed on Aug. 5, 2013, and is now expired, the entire contents of each of which are incorporated herein by reference.

BACKGROUND

Inflatable dunnage bags are commonly used to stabilize cargo during transportation of cargo containers (such as railroad cars and semi-trailers), thereby improving safety and reducing the likelihood of damage to the cargo. Dunnage bags are commonly inflated and deflated before and after use through valves configured for this purpose. Dunnage bags may be positioned in any voids or spaces between the cargo and/or between the cargo and the walls of the cargo container and inflated to a desired internal pressure, such as a designated operating pressure.

To inflate a dunnage bag, the user connects a pressurized air supply to the valve, which is attached to the inflatable/deflatable body of the dunnage bag and which forms an opening in the dunnage bag. The user positions the dunnage bag in the appropriate void or space and then inflates the dunnage bag to the desired internal pressure using pressurized air from the pressurized air supply. When the dunnage bag needs to be repositioned during inflation, the user opens the valve associated with the dunnage bag to enable the air from within the dunnage bag to escape, partially deflating the dunnage bag. The valve is then closed and the dunnage bag can be repositioned and inflated to the desired internal pressure, such as the designated operating pressure. When the dunnage bag needs to be removed from its position between the cargo or between the cargo and the walls of the cargo container to enable the cargo to be offloaded from the cargo container, the user opens the valve associated with the dunnage bag to enable the air from within the dunnage bag to escape to deflate the dunnage bag.

During inflation, the pressure inside the dunnage bag is significantly lower than the pressure upstream of the valve due to backpressure caused by the valve itself. During deflation, dunnage bags or bag walls have been known to interfere with the valve opening, thereby impeding the escape of air for proper deflation. Additionally, certain dunnage bags, such as dunnage bags manufactured from paper, have been known to have a reduced burst pressure limit when used in connection with known valves. In certain cases, known valves lack the capability for high flow rates and/or are not reusable. Known valves also typically include complicated sealing mechanisms to prevent the leakage of air from an inflated dunnage bag.

Accordingly, there is a need for a new and improved valve that solves these problems, and for new and improved dunnage bags having such new and improved valves.

SUMMARY

Various embodiments of the present disclosure provide a reusable valve in which a seal portion is co-molded with and overmolded to the valve stem to provide a secure mechanical bond therebetween. In one embodiment, the valve includes a snap fit between the valve stem and a retaining cap to provide easy assembly of the valve as well as an efficient and compact retention mechanism for a biasing spring and the valve stem in relation to the valve housing. In one embodiment, the valve includes an easy-to-use opening and closing mechanism that provides tactile feedback to the user when moving the valve stem to an open position and to a closed position to inflate, deflate, or maintain air or gas pressure in the inflatable article. In one embodiment, the valve minimizes backpressure during inflation of the inflatable article. In one embodiment in which the valve is employed to inflate and deflate a dunnage bag, the valve is suitable for use with higher dunnage bag burst pressures when the dunnage bag is made from paper while maximizing the flow rate of air through the valve. This solves the above problems.

More specifically, in one embodiment, the valve includes: (a) a housing including: (i) a flange configured to mount the valve to an inflatable article, (ii) an outer wall extending from the flange, and (iii) an annular wall extending radially inward from the outer wall and away from the outer wall in a direction of flow associated with inflation of the inflatable article; (b) a stem connected to the housing and moveable to an open position and to a closed position relative to the housing, the stem including a shaft and a base extending radially outward from the shaft and away from the shaft in the direction of flow associated with inflation of the inflatable article; (c) a spring biasing the stem toward the closed position relative to the housing; (d) a key connected to the stem and configured to retain the spring and the stem relative to the housing and to enable movement of the stem to the closed position and to the open position; and (e) a handle removably connected to the housing, the handle positionable opposite the flange to secure a wall of the inflatable article therebetween.

In another embodiment, the valve includes: (a) a housing including: (i) a flange configured to mount the valve to an inflatable article, (ii) an outer wall extending from the flange, and (iii) an annular wall extending radially inward from the outer wall and away from the outer wall in a direction of flow associated with inflation of the inflatable article; (b) a stem connected to the housing and moveable to an open position and to a closed position relative to the housing, the stem including (i) a shaft; (ii) a base extending radially outward from the shaft and away from the shaft in the direction of flow associated with inflation of the inflatable article; and (iii) one or more walls defining a first slot and one or more walls defining a second slot adjoining the first slot, the one or more walls defining the first slot permitting a first direction of motion of the stem and the one or more walls defining the second slot permitting a second different direction of motion of the stem, the one or more walls defining the first slot and the one or more walls of the second slot configured to receive a protrusion connected to the housing; (c) a spring biasing the stem toward the closed position relative to the housing; (d) a key snap fit with the stem and abutting the spring to retain the spring and the stem relative to the housing, the key configured to enable movement of the stem to the closed position and to the open position; and (e) a handle removably connected to the housing, the handle positionable opposite the flange to secure a wall of the inflatable article therebetween.

In another embodiment, the present disclosure relates to a dunnage bag including: an inflatable/deflatable body including one or more walls; and an inflation/deflation valve mounted to the body, the valve including (a) a housing including: (i) a flange configured to mount the valve to the dunnage bag, (ii) an outer wall extending from the flange, and (iii) an annular wall extending radially inward from the outer wall and away from the outer wall in a direction of flow associated with inflation of the dunnage bag; (b) a stem connected to the housing and moveable to an open position and to a closed position relative to the housing, the stem including a shaft and a base extending radially outward from the shaft and away from the shaft in the direction of flow associated with inflation of the inflatable article; (c) a spring biasing the stem toward the closed position relative to the housing; (d) a key connected to the stem and configured to retain the spring and the stem relative to the housing and to enable movement of the stem to the closed position and to the open position; and (e) a handle removably connected to the housing, the handle positionable opposite the flange to secure one of the one or more walls of the dunnage bag therebetween.

Additional features and advantages of the present disclosure are described in, and will be apparent from, the following Detailed Description and the Figures.

BRIEF DESCRIPTION OF THE DRAWINGS

FIGS. 17A and 17B illustrate top perspective and bottom perspective views of another embodiment of the handle.

DETAILED DESCRIPTION

Figure 1:
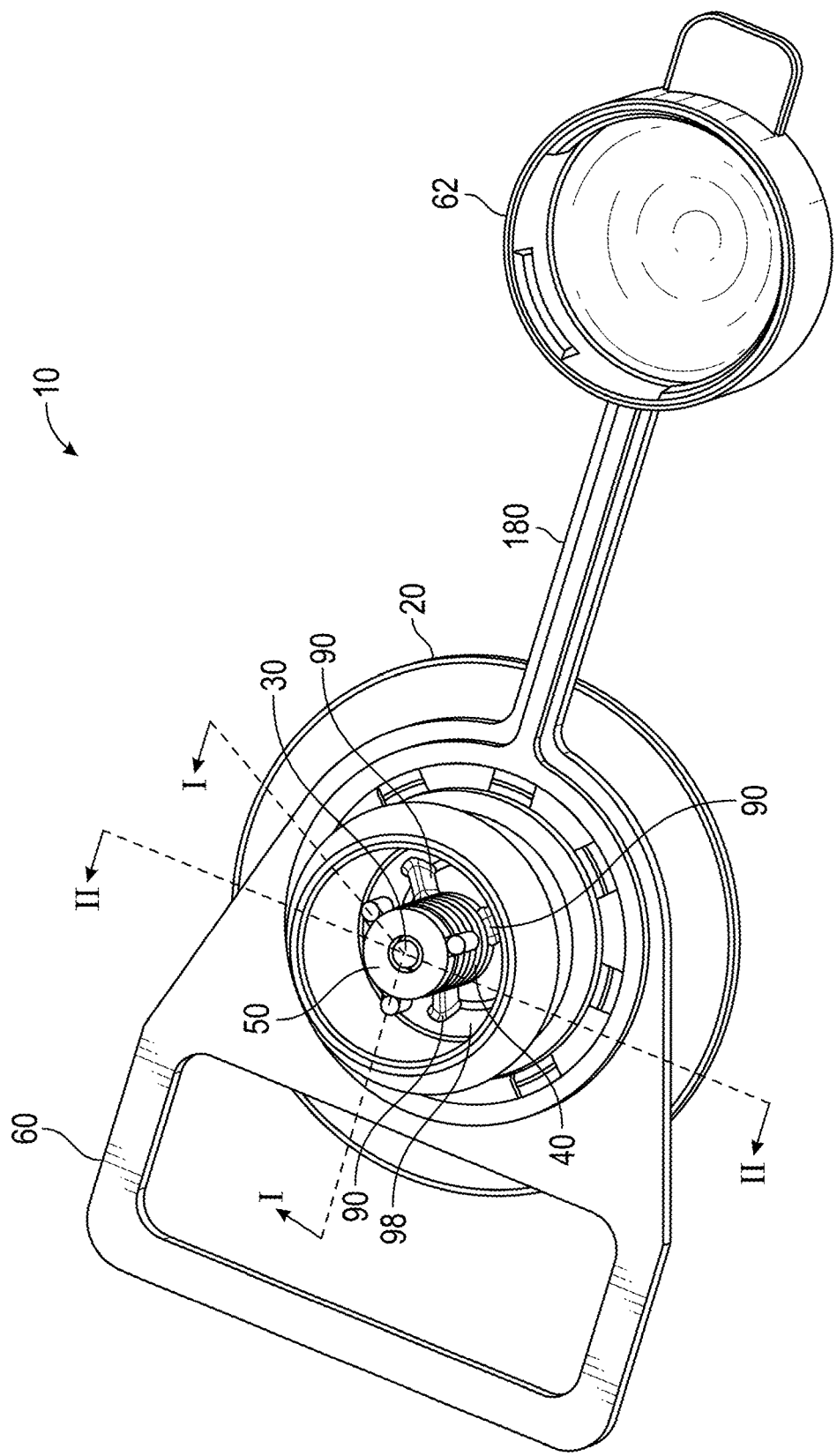
FIG. 1 is a top perspective view of one embodiment of a valve of the present disclosure.
Figure 2:
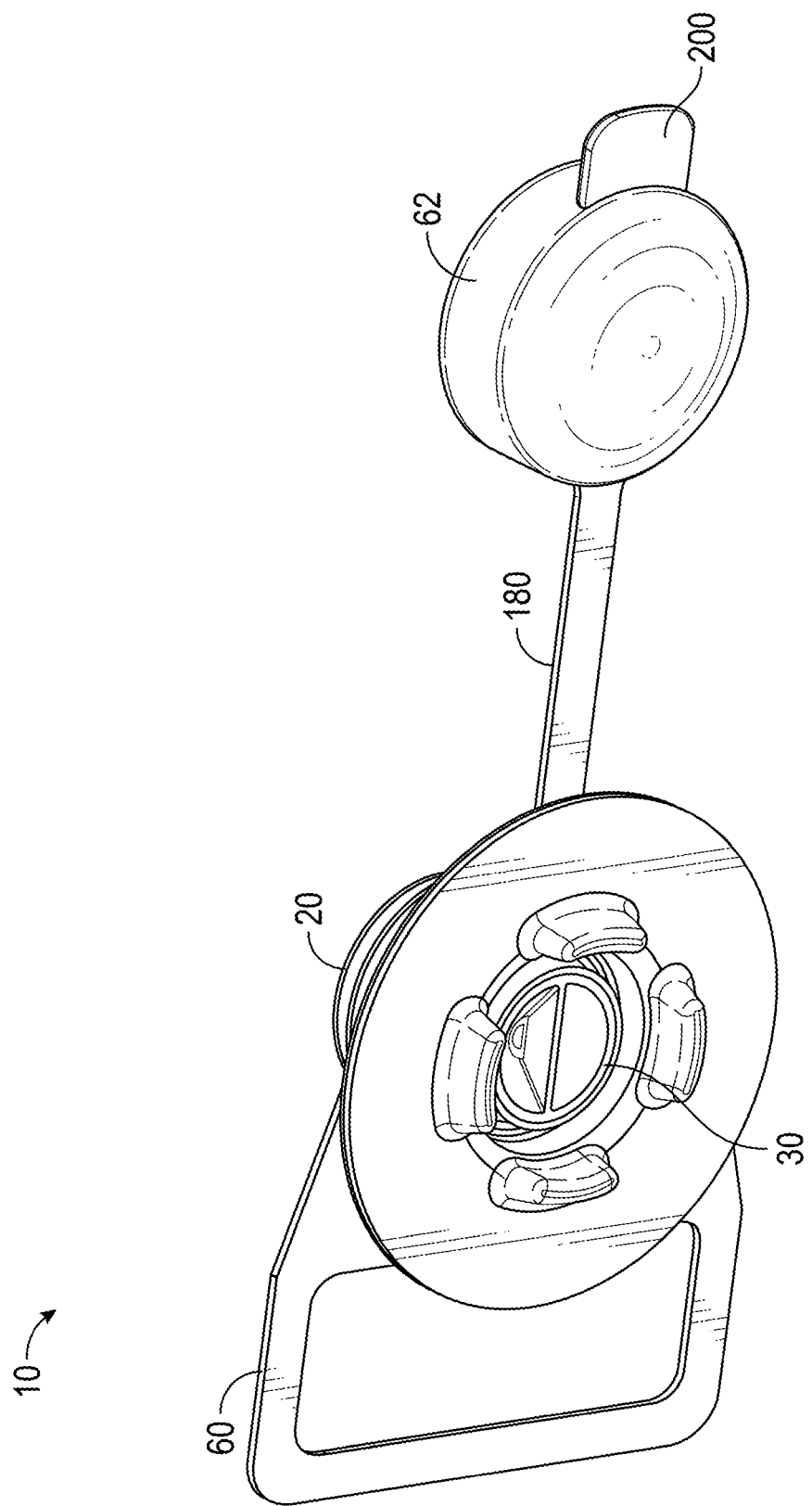
FIG. 2 is a bottom perspective view of the valve of FIG. 1.

Various embodiments of the present disclosure provide a reusable valve in which a seal portion is co-molded with and overmolded to the valve stem to provide a secure mechanical bond therebetween. In one embodiment, the valve includes a snap fit between the valve stem and a retaining cap to provide easy assembly of the valve as well as an efficient and compact retention mechanism for a biasing spring and the valve stem in relation to the valve housing. In one embodiment, the valve includes an easy-to-use opening and closing mechanism that provides tactile feedback to the user when moving the valve stem to an open position and to a closed position to inflate, deflate, or maintain air or gas pressure in the inflatable article. In one embodiment, the valve minimizes backpressure during inflation of the inflatable article.

It should be appreciated that the valve of the present disclosure may be used in connection with any suitable inflatable articles such as, but not limited to: dunnage bags, bags other than dunnage bags, air mattresses, rafts, tires, structures, and/or boats.

Referring now to the drawings, FIGS. 1 to 16 illustrate one embodiment of the valve of the present disclosure, which is generally indicated by numeral 10, being used in connection with a dunnage bag. In this embodiment, valve 10 includes: (a) housing 20 configured to mount to a dunnage bag (shown generally by numeral 70); (b) stem 30 connected to and moveable relative to housing 20, and configured to open and close passage 96 for a suitable gas such as air to pass to and from an internal portion (not shown) of dunnage bag 70; (c) spring 40 to bias stem 30 toward a closed position relative to housing 20; (d) key 50 to retain spring 40 and stem 30 relative to housing 20 and to enable a user to move stem 30 to a closed position and to an open position; and (e) handle 60 to secure valve 10 to dunnage bag 70 and to enable a user to easily grip and externally manipulate valve 10, handle 60 including cap 62 to cover and protect passage 96 to be free from dust and debris when valve 10 is not in use by the user.

Figure 3:
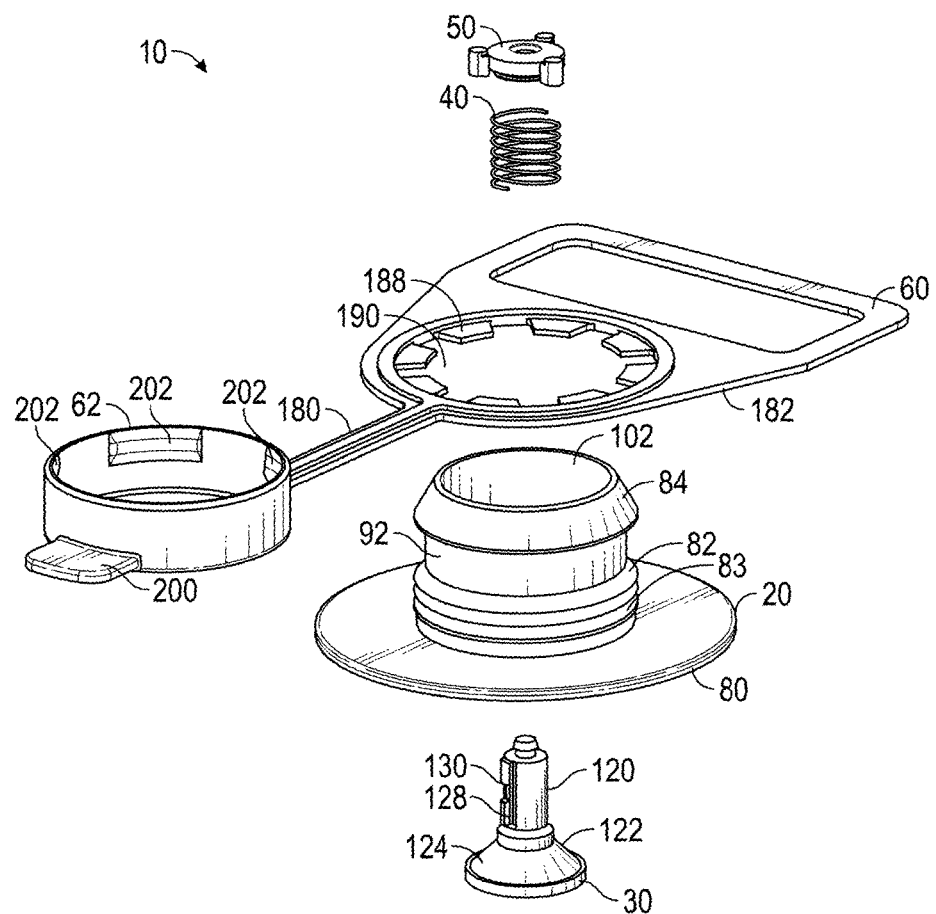
FIG. 3 is a top perspective exploded view of the valve of FIG. 1.
Figure 4:
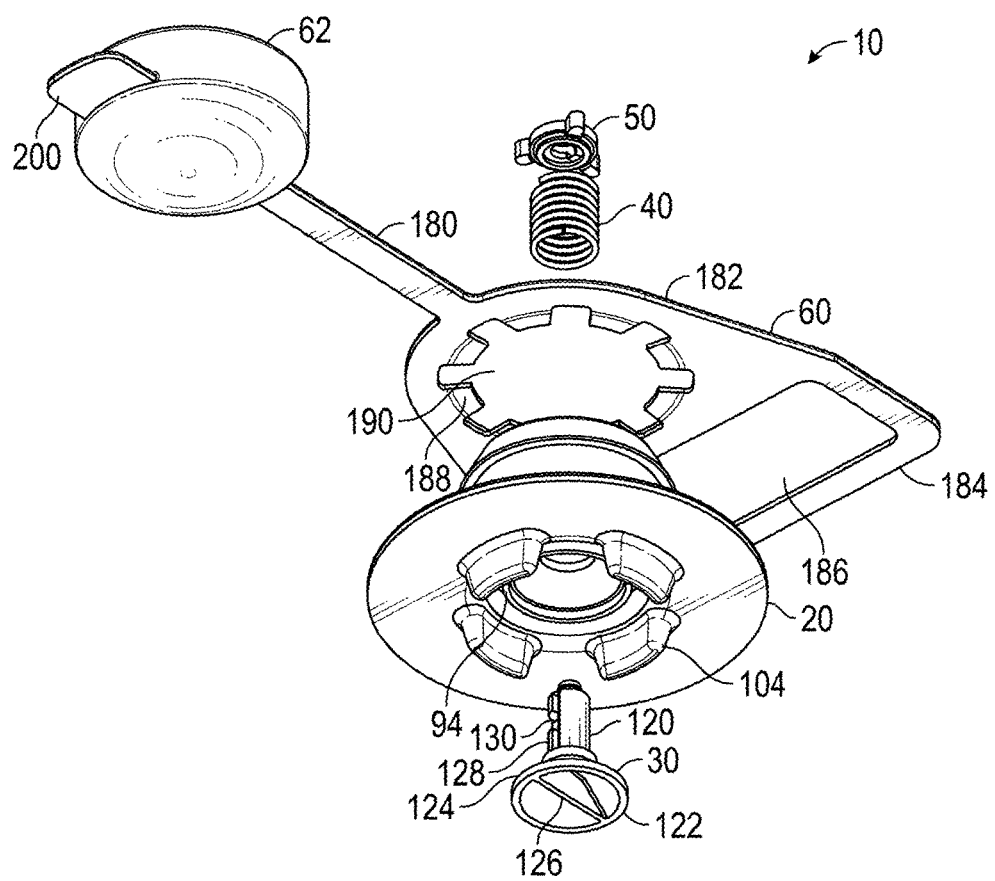
FIG. 4 is a bottom perspective exploded view of the valve of FIG. 1.
Figure 5:
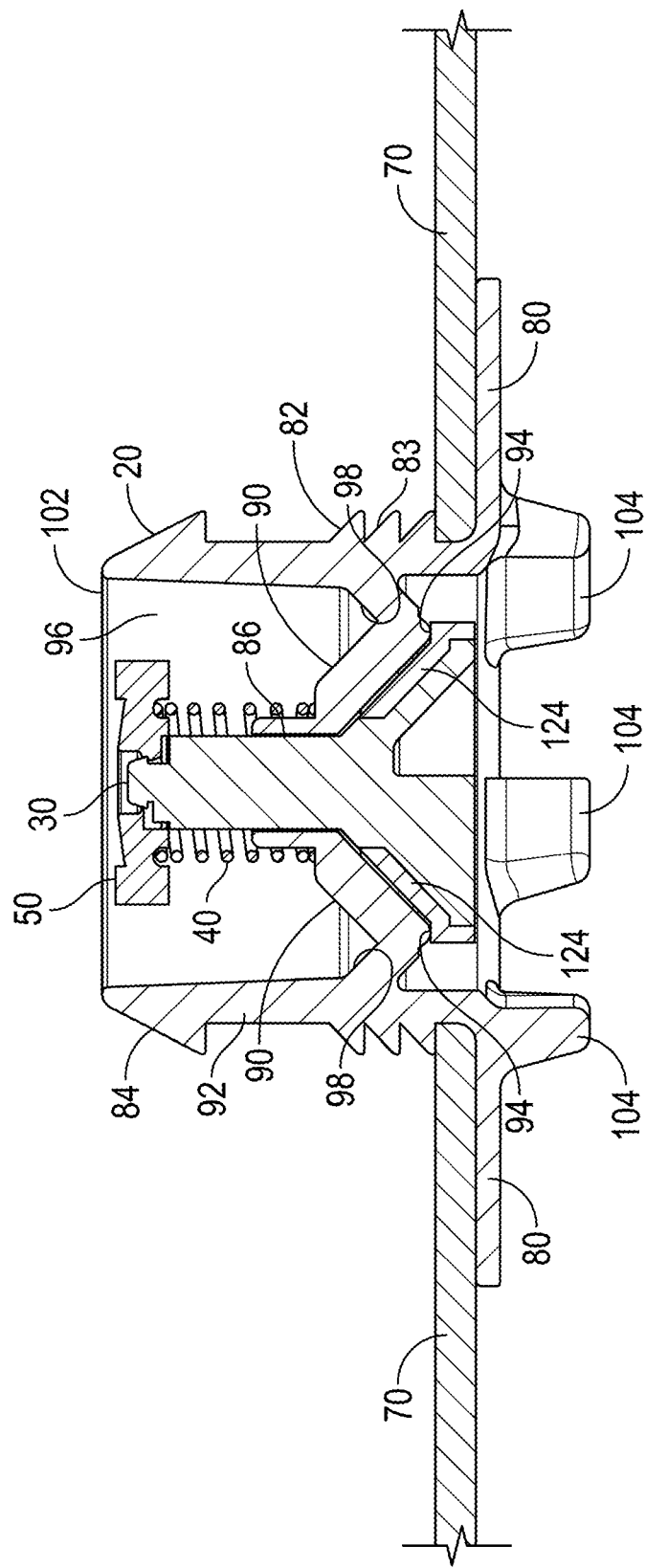
FIG. 5 is a side cross sectional view of the valve of FIG. 1 showing the valve in a closed position.
Figure 6:
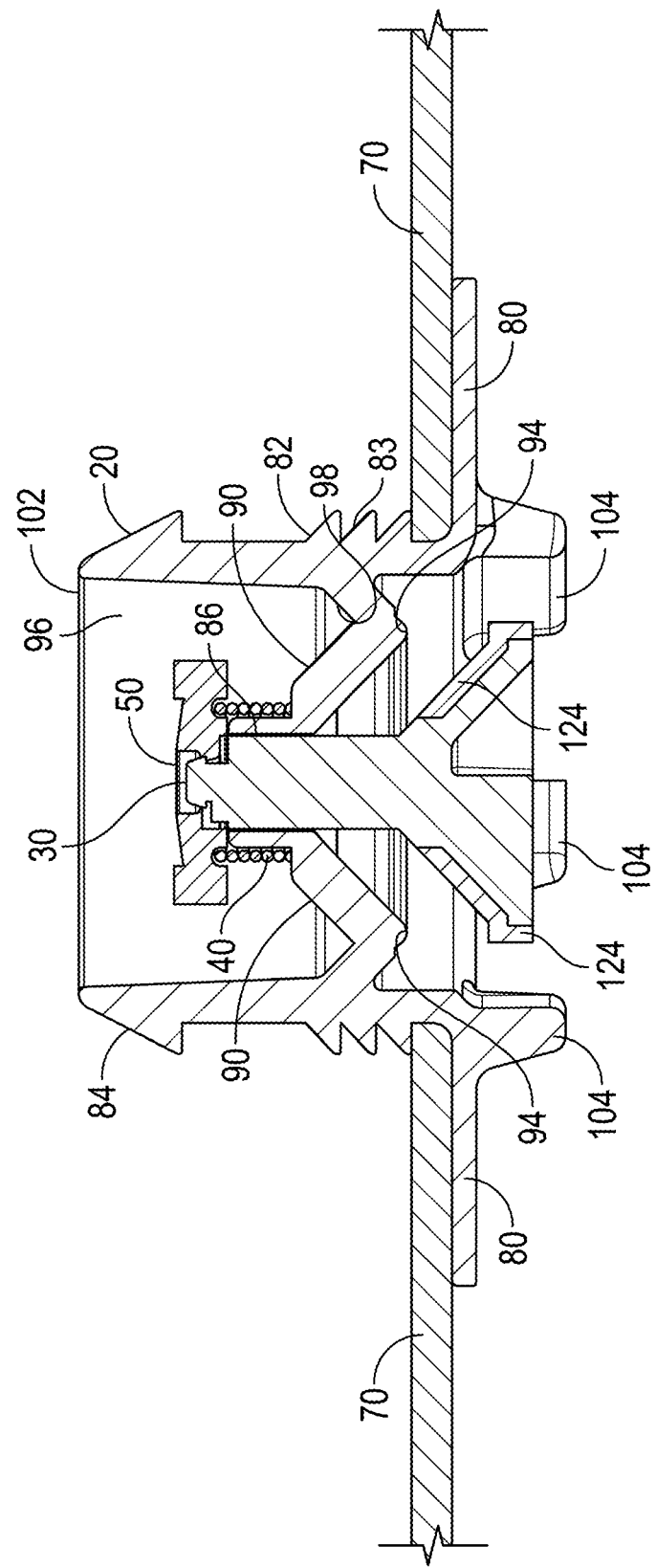
FIG. 6 is a side cross sectional view of the valve of FIG. 1 showing the valve in an open position.
Figure 7:
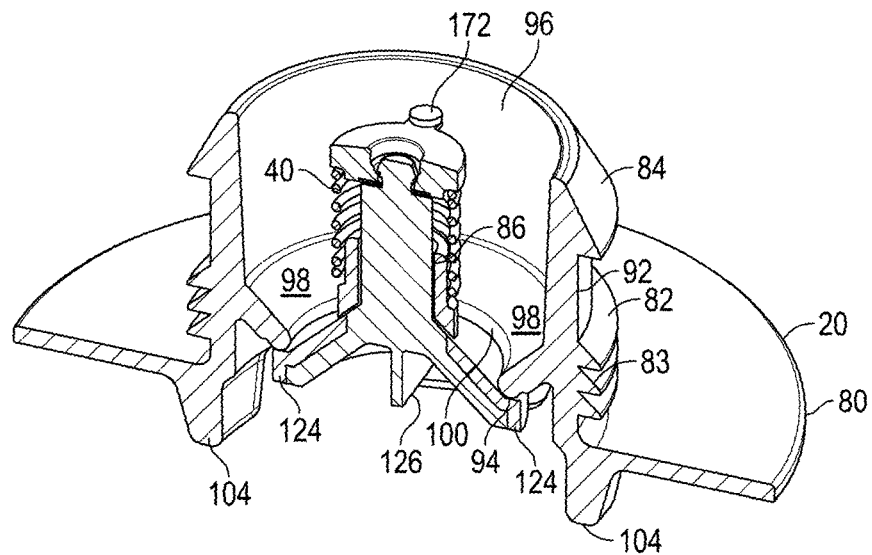
FIG. 7 is a top perspective section view of the valve of FIG. 1 showing the valve in a closed position.
Figure 8:
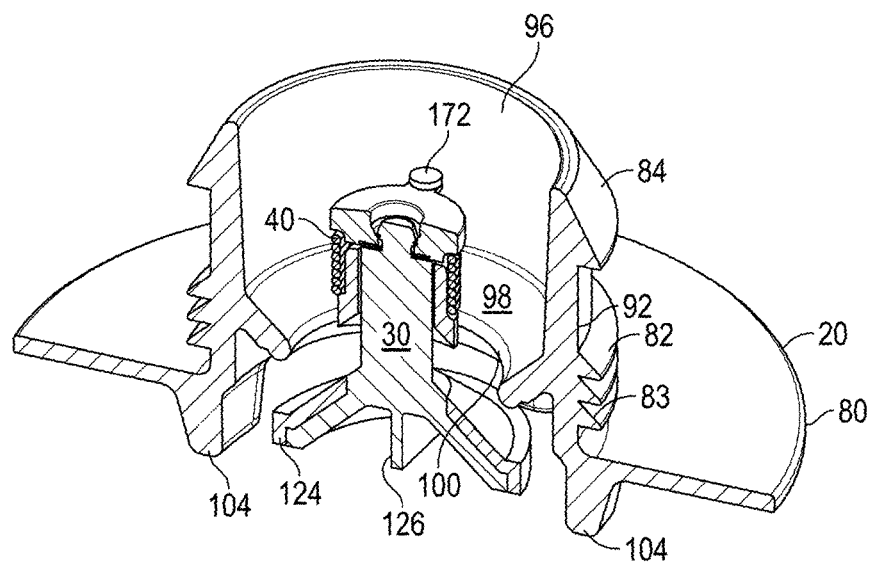
FIG. 8 is a top perspective section view of the valve of FIG. 1 showing the valve in an open position.
Figure 9:
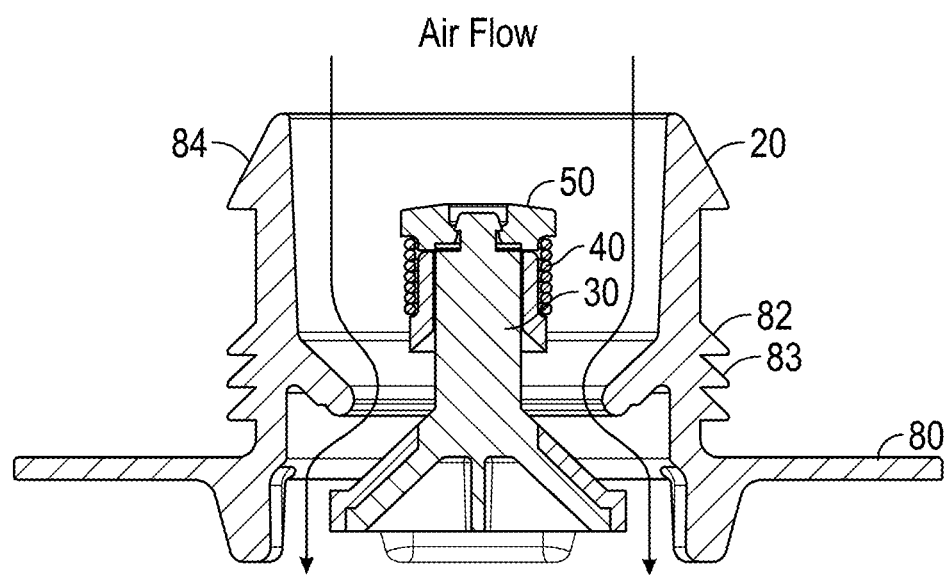
FIG. 9 is a side section view of the valve of FIG. 1 showing the valve in an open position and showing the direction of airflow during inflation of an inflatable article.

In this embodiment, housing 20 (as best shown in FIGS. 3 to 8) includes: (a) flange 80 configured to be secured to a wall of dunnage bag 70; (b) annular protrusions 82 forming grooves 83 therebetween to receive and removably retain handle 60 to housing 20; (c) annular ring 84 to receive and removably retain cap 62 of handle 60 to housing 20 and to receive and removably secure an inflation device to valve 10 to inflate dunnage bag 70; (d) one or more walls defining aperture 86 to receive and engage with stem 30; (e) protrusion 88 (as best shown in FIGS. 11 to 15) extending radially inward from the one or more walls defining aperture 86 and configured to slidably engage with a receiving portion of stem 30 to permit a user to move stem 30 to an open position and to a closed position; (f) a plurality of supports 90 (as best shown in FIGS. 1, 5 and 6) configured to support the one or more walls defining aperture 86 relative to outer wall 92; (g) seat 94 configured to mate with stem 30 to seal valve 10 when in the closed position; (h) wall 98 extending inwardly and downwardly away from opening 102 of outer wall 92 to form aperture 100 to reduce backpressure of air flowing through valve 10; and (i) standoffs 104 extending from a bottom surface of flange 80 to help prevent dunnage bag 70 from sealing itself to the bottom of valve 10 thereby facilitating easier deflation of dunnage bag 70. Housing 20 may include a plastic, such as polyethylene. Spring 40 may include a steel, such as a stainless steel or a corrosion resistant steel.

In this embodiment, annular protrusions 82 are positioned relative to flange 80 along an outer portion of outer wall 92 and are configured to receive handle 60 at any of a plurality of different locations along outer wall 92 to permit attachment of valve 10 to dunnage bag 70. In this way, valve 10 can accommodate and be installed upon dunnage bag 70 having a range of wall thicknesses, including the wall thicknesses of all substrate layers associated with or used in combination with dunnage bag 70.

In this embodiment, stem 30 (as best shown in FIGS. 3 to 4 and 10 to 16) includes: (a) shaft 120 to slidably engage with the one or more walls defining aperture 86 of housing 20; (b) body portion 122; (c) seal 124; (d) rib 126; (e) one or more walls defining slot 128 and slot 130 to receive and engage with protrusion 88 (as best shown in FIGS. 11 to 15); (f) chamfer 132 to engage with protrusion 88; (g) shoulder 136; and (h) head 134 configured to engage with key 50 and including (1) top portion 138, (2) recessed body portion 140, and (3) lip 142. In one embodiment, seal 124 is co-molded with body portion 122 via, for example, an injection molding process, thereby causing seal 124 to be integrally formed as a part of stem 30. In this way, a secure mechanical bond is formed between seal 124 and body portion 122 of stem 30. In one embodiment, stem 30 includes a plastic, such as polypropylene. In one embodiment, seal 124 is made from or includes an elastomer, such as a vulcanized elastomer or a thermoplastic vulcanizate. For example, a suitable material for seal 124 is SANTOPRENE® (SANTOPRENE is a registered trademark of Monsanto Company Corporation), which is manufactured by ExxonMobil Chemical. It should be appreciated that other materials can be employed for the seal.

Body portion 122 (as best shown in FIGS. 4, 7, 8, and 10) is configured in the shape of a hollow cone with an open base where rib 126 provides rigidity to body portion 122 while also permitting material savings in the manufacture of stem 30. The cone of body portion 122 extends downwardly and outwardly from or near the base of shaft 120 to reduce backpressure of air flowing through valve 10. The one or more walls defining slot 128 generally extend longitudinally along a portion of shaft 120, and are configured to captively receive protrusion 88 of housing 20. The one or more walls defining slot 128 are configured to permit stem 30 to longitudinally translate to enable opening and closing of valve 10. The one or more walls defining slot 130 extend laterally at an angle from the one or more walls defining slot 128 to permit captive rotation of stem 30 by the one or more walls defining aperture 86. In this embodiment, the angle is approximately 90 degrees but could, in other embodiments, be a different angle. The one or more walls defining slot 130 are configured to enable the user to lock stem 30 into an open position relative to housing 20 to permit air to enter or escape from dunnage bag 70. In one embodiment, the one or more walls defining slot 130 are curved. Chamfer 132 is configured to transition stem 30 during actuation of valve 10 toward an open or toward a closed position.

Figure 10:
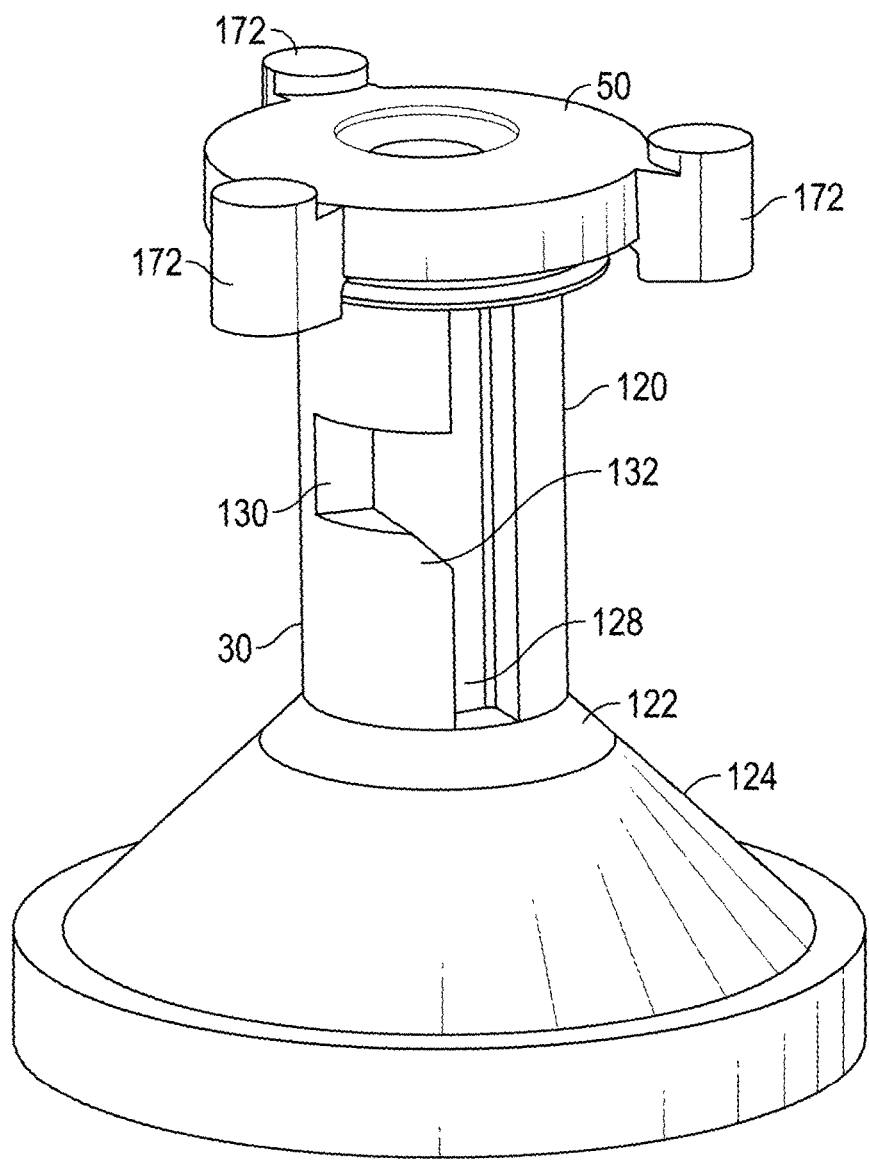
FIG. 10 is a top perspective view of the stem and key of the valve of FIG. 1.
Figure 11:
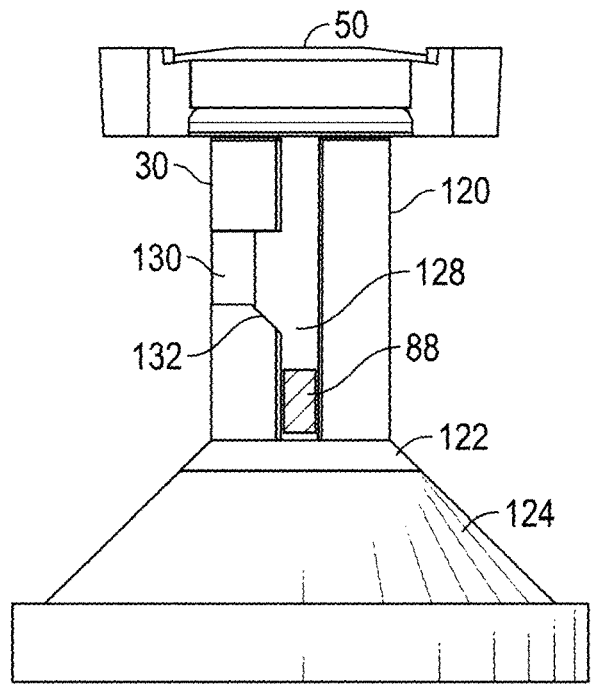
FIG. 11 is a side elevation view of the stem and key of FIG. 10 showing the stem in a closed position relative to the valve housing.
Figure 12:
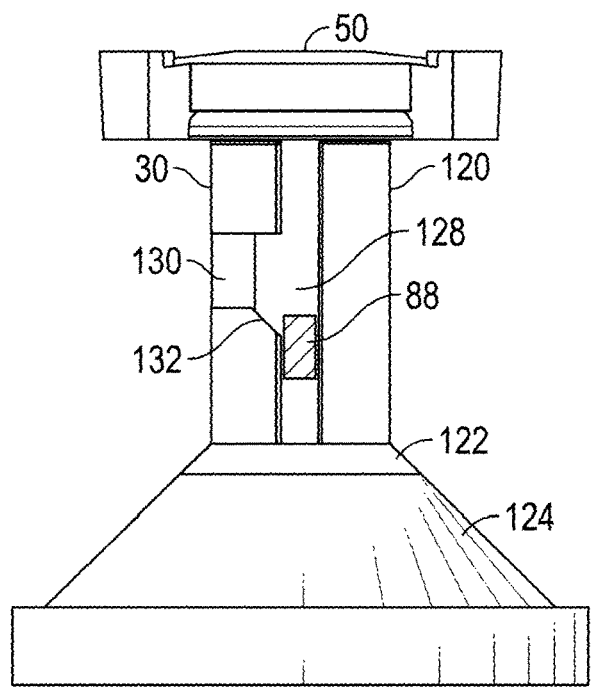
FIG. 12 is a side elevation view of the stem and key of FIG. 10 showing the stem in a partially open position relative to the valve housing.
Figure 13:
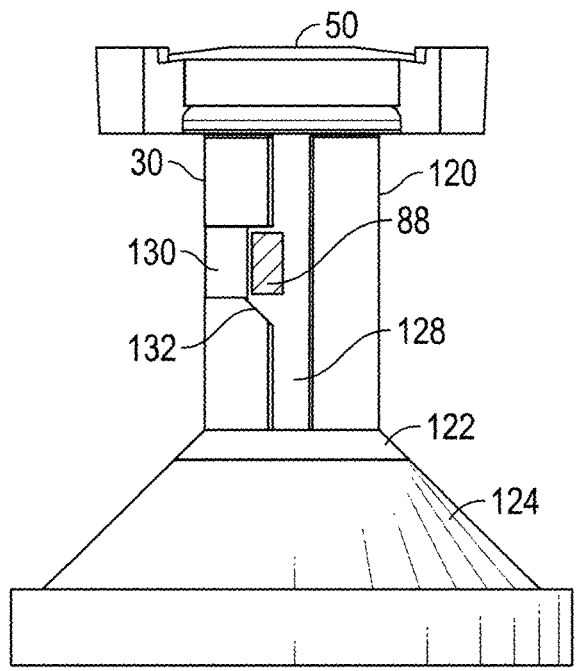
FIG. 13 is a side elevation view of the stem and key of FIG. 10 showing the stem in an open but unlocked position relative to the valve housing.
Figure 14:
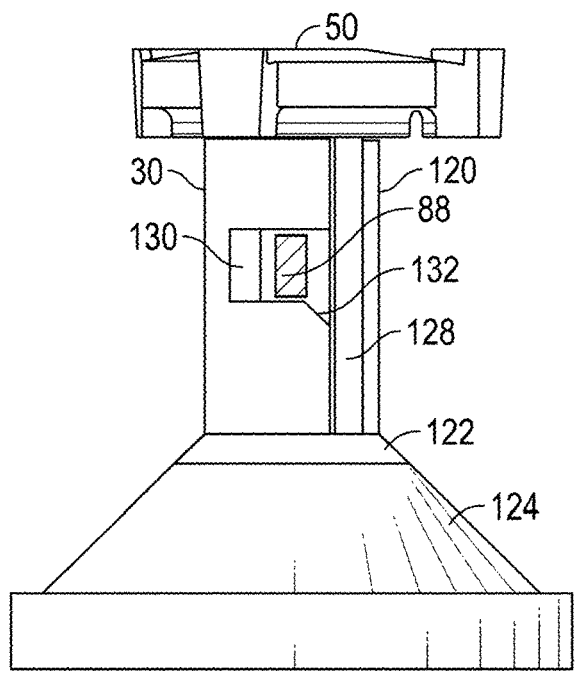
FIG. 14 is a side elevation view of the stem and key of FIG. 10 showing the stem in an open and a first locked position relative to the valve housing.
Figure 15:
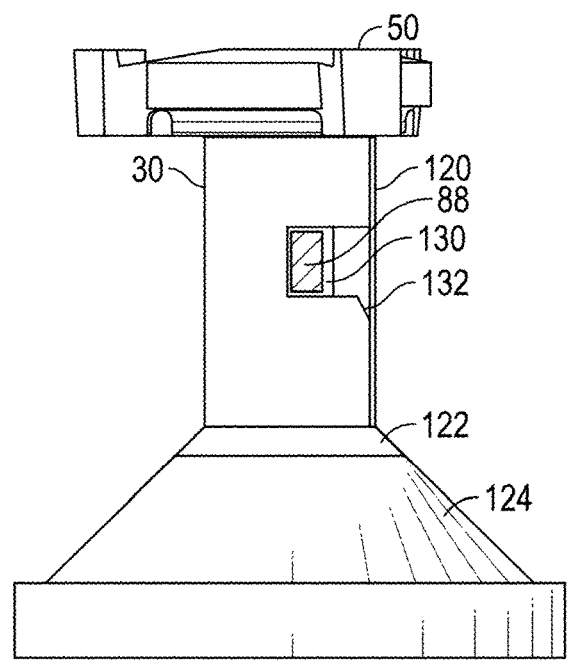
FIG. 15 is a side elevation view of the stem and key of FIG. 10 showing the stem in an open and a second locked position relative to the valve housing.
Figure 16:
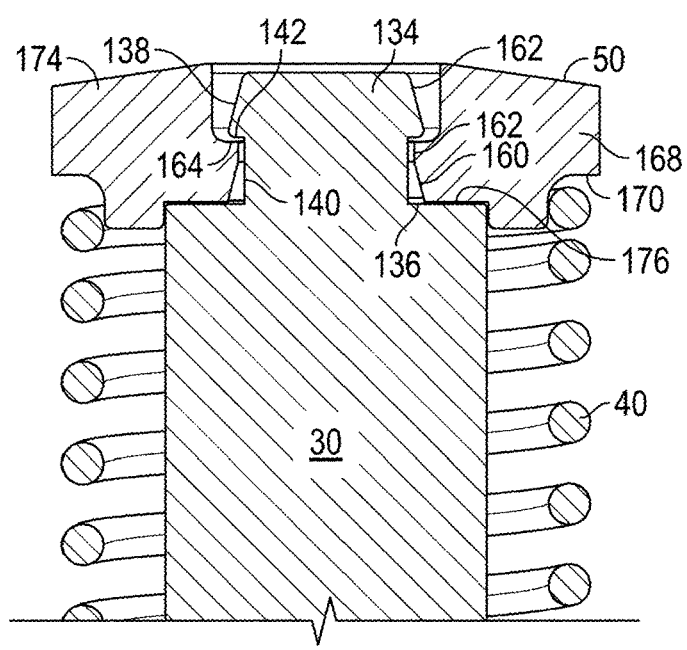
FIG. 16 is a partial detail section view of the stem, key, and spring of the valve of FIG. 1.

In this embodiment, key 50 (as best shown in FIGS. 10 and 16) includes: (a) female portion 160 to engage with top portion 138 of head 134; (b) one or more walls defining aperture 162 configured to abut or lie in proximity to recessed body portion 140; (c) shoulder 164 configured to be overlapped by lip 142 after assembling key 50 to stem 30 to permit retention of spring 40 and stem 30 relative to housing 20; (d) recess 166; (e) annular protrusion 168 configured to abut an outer periphery of shaft 120 of stem 30; (f) shoulder 170 configured to abut an end coil of spring 40 to retain spring 40 relative to housing 20; (g) protrusions 172 oriented on a periphery of body 174 to enable a user's fingers to grip key 50 to open and close valve 10; and (h) bottom surface 176 configured to mate with shoulder 136 of stem 30. In this embodiment, female portion 160 provides a snap fit with top portion 138. In this embodiment, top portion 138 and female portion 160 include conical shapes to aid the assembly of female portion 160 with top portion 138, but may, in other embodiments, have other suitable shapes. Key 50 may include a plastic, such as polypropylene.

In this embodiment, handle 60 (as best shown in FIGS. 3 and 4) includes: (a) cap 62; (b) tether 180 flexibly connecting cap 62 to body 182; (c) grip 184 including one or more walls defining aperture 186; and (d) spaced apart tabs 188 extending inwardly from aperture 190 defined by one or more walls of body 182 to removably engage with annular protrusions 82 of housing 20. Handle 60 may include a plastic, such as polypropylene.

In this embodiment, cap 62 includes: (a) tab 200 extending from cap 62 to permit the easy removal of cap 62 from housing 20 when installed thereon; and (b) protrusions 202 extending inwardly from an inner surface of cap 62 and which are configured to engage with annular ring 84 of housing 20 to removably retain cap 62 to housing 20. Protrusions 202 provide a snap fit with annular ring 84. Cap 62 is configured to receive indicia on an outer surface of cap 62. In this embodiment, the indicia is integrally formed as a part of cap 62.

In this embodiment, spaced apart tabs 188 are configured to deflect upon installation of handle 60 onto housing 20 and lie at least partially in or about one or more grooves 83 and/or one or more annular protrusions 82 of housing 20. Dunnage bag 70, including all plies, layers and substrates associated with a wall of dunnage bag 70, is configured to lie between flange 80 of housing 20 and body 182 to thereby secure valve 10 to dunnage bag 70. Valve 10 may be loosened from any external plies of dunnage bag 70 by removing handle 60 from housing 20.

In this embodiment, the closed position of valve 10 is the appropriate position for beginning the process of inflating dunnage bag 70. In this embodiment, an inflation device may be configured to press against the key to cause stem 30 to move thereby opening valve 10. In this embodiment, stem 30 moves to, but need not lock in, an open position. Dunnage bag 70 is then inflated to the desired pressure and the inflation device is removed from valve 10, thus closing valve 10. During inflation, the angle of wall 98 of housing 20 and the angle of body portion 122 of stem 30 individually and together minimize backpressure of the flow of air through valve 10 by minimizing changes in the direction of the flowing air and by gradually changing the direction of the air when needed. In one embodiment, the inflation device engages with annular ring 84 to secure the inflation device onto housing 20.

To open valve 10 when initially in the closed position to at least partially deflate dunnage bag 70, a user would grip key 50 and potentially protrusions 172 and push against the force provided by spring 40 in a direction of travel provided by the one or more walls defining aperture 86 and the combination of protrusion 88 and the one or more walls defining slot 128. To position stem 30 in a self sustaining open position, a user would, in addition to pushing against spring 40, rotate key 50 and therefore stem 30 in a direction of travel provided by the combination of protrusion 88 and the one or more walls defining slot 130. The user would rotate key 50 and therefore stem 30 in a counter-clockwise manner at least until the tension of spring 40 is taken up by the one or more walls defining slot 130. Chamfer 132 helps guide protrusion 88 toward the walls defining slot 130 when opening valve 10 and away from the walls defining slot 130 when closing valve 10. When in the open position, valve 10 is configured to deflate dunnage bag 70. The rotation and translation of stem 30 described above many be reversed to seat seal 124 upon seat 94 to close valve 10.

FIGS. 17A and 17B illustrate another embodiment of the handle, which is generally indicated by numeral 1060. In this embodiment, handle 1060 includes: (a) cap 1062; (b) first tether 1180 flexibly connecting cap 1062 to body 1182; (c) grip 1184 including one or more walls defining aperture 1186; (d) second tether 1181 flexibly connecting grip 1184 to body 1182, and (e) spaced apart tabs 1188 extending inwardly from aperture 1190 defined by one or more walls of body 1182 to removably engage with annular protrusions 82 of housing 20.

In this illustrated embodiment, cap 1062 includes: (a) tab 1200 extending from cap 1062 to permit the easy removal of cap 1062 from housing 20 when installed thereon; and (b) protrusions 1202 extending inwardly from an inner surface of cap 1062 and which are configured to engage with annular ring 84 of housing 20 to removably retain cap 1062 to housing 20. Protrusions 1202 provide a snap fit with annular ring 84. Cap 1062 is configured to receive indicia on an outer surface of cap 1062. In this illustrated embodiment, the indicia is integrally formed as a part of cap 1062.

It should be appreciated that the embodiment of the valve illustrated in the accompanying Figures employs one example configuration of components and one example size and shape of each of the components. It should be appreciated that other embodiments of the valve may employ different configurations of the components and/or components of different sizes or shapes.

It should be understood that modifications and variations may be effected without departing from the scope of the novel concepts of the present disclosure, and it should be understood that this application is to be limited only by the scope of the appended claims.

The invention is claimed as follows:

1. A valve comprising:
    a housing that includes: (1) an inner cylindrical wall that defines an opening; and (2) an annular wall that extends radially inward from the inner cylindrical wall and away from the opening; and
    a stem that includes a shaft and a base, wherein the base extends radially outward from the shaft and away from the opening, wherein the stem is connected to the housing and movable relative to the housing between an open position and a closed position.

2. The valve of claim 1, further comprising a biasing element that biases the stem to the closed position.

3. The valve of claim 2, further comprising a key attached to the stem, the key retaining the biasing element in place.

4. The valve of claim 1, wherein the stem is lockable in the open position via rotation of the stem relative to the housing.

5. The valve of claim 1, wherein the shaft of the stem defines a first slot and the housing includes a protrusion at least partly positioned within the first slot to slidably retain the stem relative to the housing and enable the stem to move relative to the housing between the open position and the closed position.

6. The valve of claim 5, wherein the shaft of the stem also defines a second slot that extends transversely from the first slot.

7. The valve of claim 6, wherein the second slot is approximately perpendicular to the first slot.

8. The valve of claim 6, wherein the second slot is oriented so the stem is held in the open position when the protrusion is positioned within the second slot.

9. The valve of claim 1, further comprising an annular valve seat, wherein when the stem is in the closed position, the base of the stem sealingly engages the valve seat.

10. The valve of claim 9, wherein when the stem is in the open position, the base of the stem is spaced apart from the valve seat.

11. The valve of claim 10, which includes an elastomeric seal on the base of the stem, the seal configured to sealingly engage the valve seat when the stem is in the closed position.

12. The valve of claim 9, wherein the valve seat is connected to the annular wall.

13. A valve comprising:
    a housing that includes: (1) an inner cylindrical wall that defines an opening; (2) an annular wall that extends radially inward from the inner cylindrical wall and away from the opening; and (3) a protrusion; and
    a stem that includes a shaft and a base, the base extending radially outward from the shaft and away from the opening, the shaft of the stem defining a first slot and a second slot extending transversely from the first slot, the protrusion positioned in one of the slots to slidably retain the stem relative to the housing,
    wherein the first slot enables axial movement of the stem relative to the housing between an open position and a closed position and the second slot enables rotation of the stem relative to the housing between a locked position and an unlocked position.

14. The valve of claim 13, further comprising a biasing element that biases the stem to the closed position.

15. The valve of claim 14, further comprising a key attached to the stem, the key retaining the biasing element in place.

16. The valve of claim 13, wherein the second slot is oriented so the stem is in the unlocked position and held in the open position when the protrusion is positioned within the second slot.

17. The valve of claim 13, further comprising an annular valve seat, wherein when the stem is in the closed position, the base of the stem sealingly engages the valve seat.

18. The valve of claim 17, wherein when the stem is in the open position, the base of the stem is spaced apart from the valve seat.

19. The valve of claim 17, wherein the valve seat is connected to the annular wall.

20. An inflatable article comprising:
    an inflatable/deflatable body including one or more walls; and
    an inflation/deflation valve mounted to the body, the valve including:
        (a) a housing that includes: (1) an inner cylindrical wall that defines an opening; and (2) an annular wall that extends radially inward from the inner cylindrical wall and away from the opening; and
        (b) a stem that includes a shaft and a base, wherein the base extends radially outward from the shaft and away from the opening, wherein the stem is connected to the housing and movable relative to the housing between an open position and a closed position.

* * * * *